June 1, 1965   B. A. MAIR   3,186,224
CONDUCTIVE LIQUID LEVEL SENSING DEVICES
Filed Dec. 31, 1962   3 Sheets-Sheet 1
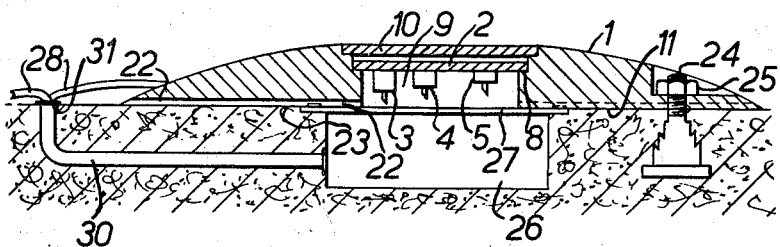
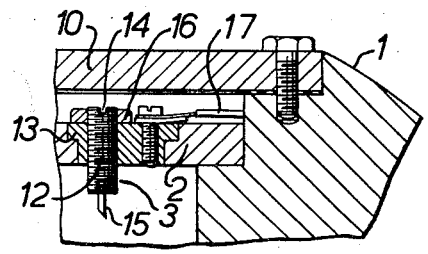
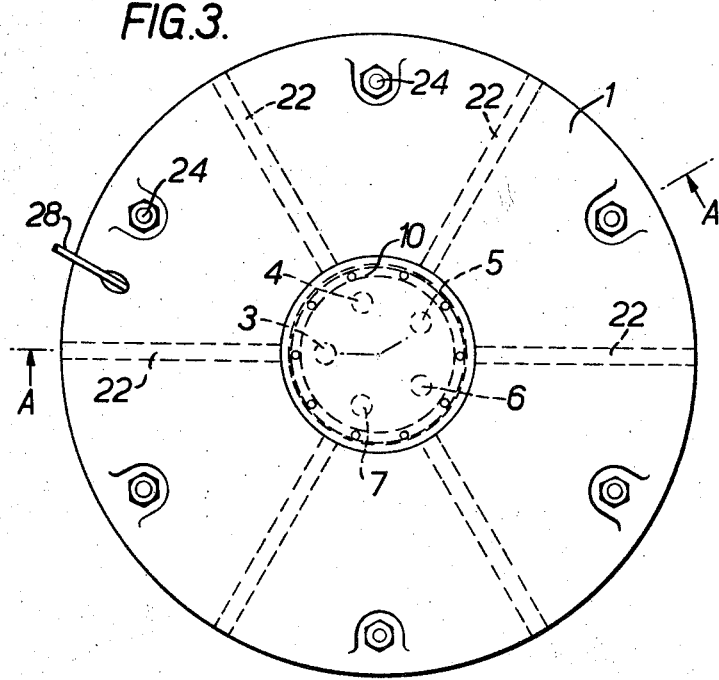

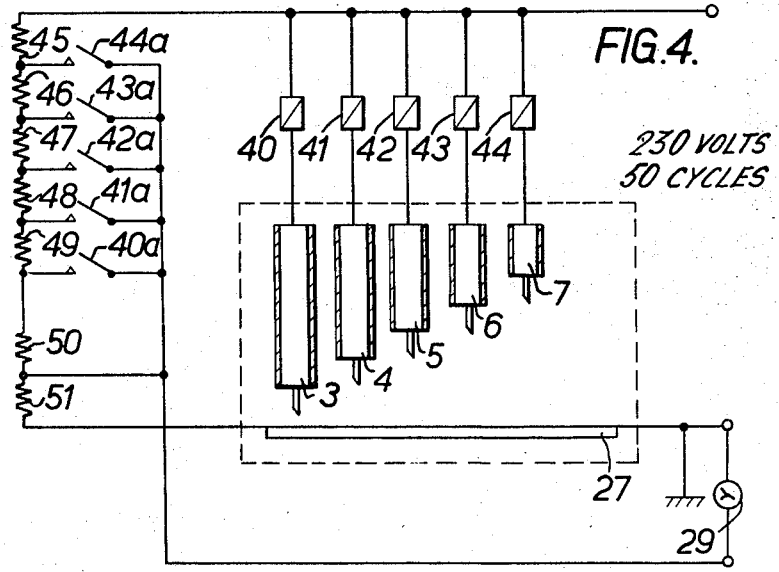

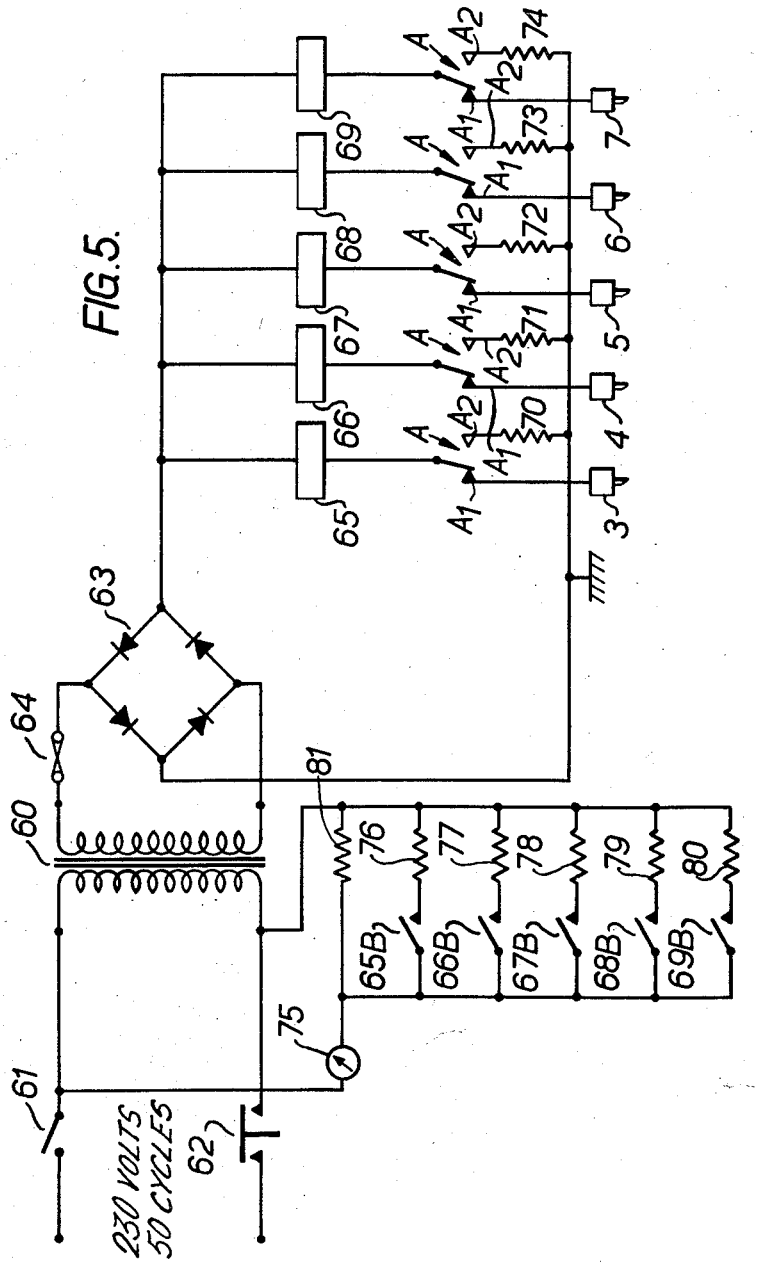

United States Patent Office 3,186,224
Patented June 1, 1965

3,186,224
CONDUCTIVE LIQUID LEVEL SENSING DEVICES
Brian A. Mair, Farnborough, Hants, England, assignor to Inertia Switch Limited, a company of Great Britain
Filed Dec. 31, 1962, Ser. No. 248,473
Claims priority, application Great Britain, Jan. 9, 1962, 853/62
8 Claims. (Cl. 73—304)

This invention relates to conductive liquid level sensing devices and more particularly but not necessarily exclusively to devices for measuring the depth of rainwater on an airfield runway or motor road.

In certain applications it is advantageous to provide a "coarse" indication of the depth of water lying on a level surface, for example in units of one inch difference in levels, and in other applications it is necessary to provide a very "fine" indication of depth for example, in units of 0.1 inch or less. This latter application has recently become of importance in measuring the depth of rainwater on aircraft runways and high speed motor roads.

With the advent of high speed aircraft and the construction of high speed motor roads, various problems have become manifest which previously were either unrecognized or considered of no importance. One of these problems that has now assumed considerable importance is that associated with the adverse effects on high speed aircraft landing and taking off from an aircraft runway and on motor vehicles travelling at high speeds in bad weather conditions in which the aircraft runways or road is covered in rainwater or thawing snow. Recent investigations have shown that in certain conditions an aircraft or motor vehicle wheel will lose contact with the surface of the runway or road and travel over the surface of the water lying thereon. This condition is referred to as "aquaplaning," and it has been shown that this can occur at speeds as low as 80 miles per hour with a depth of water as little as $\frac{1}{10}$" of an inch. The effects of "aquaplaning" can be catastrophic since in an extreme case, a driver of a motor vehicle can lose all control over braking, steering and traction. It is thus apparent that accurate measurement of the depth of water lying on runways or roads is very important so as to give an indication of conditions in which aquaplaning can occur.

Accordingly we provide a conductive liquid level sensing device comprising a series of sensing elements arranged at successively increasing levels above a datum level whereby to be contacted in turn by a liquid as the level thereof rises, and an electrical circuit in which are connected said elements, the circuit including indicator means responsive to completion of an electrically conductive path through one or more of said elements and said liquid to give an indication of the level represented by the highest liquid-contacted element.

In order that the invention may be well understood preferred embodiments thereof will now be described with reference to the accompanying drawings in which:

FIGURE 1 shows a cross sectional view along the lines A—A of FIGURE 3 of a conductive liquid level sensing device adapted to measure depth of water on a level surface;

FIGURE 2 shows a detail view in cross section of a sensing element and its mounting forming part of the device of FIGURE 1;

FIGURE 3 shows a plan view of the device of FIGURE 1;

FIGURE 4 shows an electrical circuit for providing an indication of the liquid level measured by the device of FIGURE 1, and FIGURE 5 shows an improved electrical circuit for providing an indication of the liquid level measured by the device of FIGURE 1.

The device shown in FIGURE 1 is suitable for measuring small differences in the depth of rainwater lying on a level surface for example, an aircraft runway or motor road.

Referring now to FIGURES 1, 2 and 3, a domed cover 1 has an electrically non-conductive circular plate 2 carrying sensing elements 3 to 7 arranged in a circle thereon, the plate 2 is supported on and secured to a shoulder 8 formed in the periphery of an aperture 9 located centrally in the cover 1. A head cover plate 10 is bolted down over the plate 2 to prevent ingress of rain or snow. In this embodiment of the invention the five sensing elements are arranged to measure differences in the level of a liquid in steps of 0.1 inch, but more elements could be used to measure differences in level in steps less than 0.1 inch.

The sensing elements 3 to 7 are all constructed in the same manner, and are mounted at different heights above the underside surface 11 of the cover 1. A detailed view of one of the elements, element 3, is shown in FIGURE 2. This element like all the others, comprises a threaded plug 12 screwed into a boss 13 by means of a screwdriver slot 14 in the upper end of the plug. A probe 15 is soldered or otherwise secured to the lower end of the plug. The height of the probe above the underside surface 11 is adjusted by rotating the plug 12 in the boss 13 and locking it in position by means of lock nut 16. The sensing elements 3 to 7 are connected to an external electric circuit, such as that shown in FIGURES 4 or 5, by means of wires connected thereto such as wire 17 which is connected to boss 13 by means of a solder tag and a screw as shown in FIGURE 2.

In the underside of the cover 1 a plurality of channels 22 are formed to allow water on surface 23 to flow beneath the cover to the sensing elements 3 to 7. The cover 1 is bolted down on the surface by means of bolts 24 embedded therein and nuts 25. Immediately beneath the sensing elements 3 to 7, a box 26 containing a number of relays is sunk into the surface 23 so that an electrically conductive cover plate 27 of the box 26 is flush with the surface 23. Cables 28 connect the relays to an indicator 29, FIGURE 4, or indicator 75, FIGURE 5, and to the elements 3 to 7 and are run through a pipe 30 beneath the surface 23 to emerge at a point 31 beyond the cover 1.

As shown in FIGURE 4 the energizing coils 40 to 44 of five A.C. relays are connected to the sensing elements 3 to 7 respectively and to a power source, which in this instance is a single phase 230 volt 50 cycle source. Resistances 45 to 51 are connected in series across the power source, one end of the resistance 45 being connected to that side of the source to which the energizing coils 40 to 44 are connected, and the lower end of resistance 51 is connected to the other side of the source which is earthed. The junction of the resistances 50 and 51 are connected to one side of an indicator 29 in the form of a voltmeter, the other side of the indicator being connected to earth. Relay contact sets 40a to 44a associated respectively with the energizing coils 40 to 44 are connected to the junction of resistances 49 and 50, 48 and 49, 47 and 48, 47 and 46, 45 and 46 respectively, the movable contacts of each set being connected to that side of the indicator 29 to which the junction of resistances 51 and 50 is connected. The cover plate 27 is connected to earth.

As shown in FIGURE 1, the lower extremities of the probes of the sensing elements 3 to 7 are arranged at different levels above the plate 27 which acts as a datum or reference level so that water flowing through the channels 22 under the cover 1 contacts first the probe of the lowest element and then the next lowest and so on when the water level rises. As the extremities of the probes are arranged in steps of 0.1 inch difference in level above the reference surface 23, the indicator 29 is calibrated accordingly.

In operation a circuit through one or more of the sensing elements is completed through the rainwater lying on the surface 23 which includes the plate 27 to energize the corresponding relay energizing coil to actuate its associated contact set, thereby connecting the indicator 29 to the corresponding junctions of the resistances 45 to 51. For example if the rainwater level rises to just contact the probe of the element 4 connected to coil 41 in FIGURE 4 the contact set 41a will close (set 40a already being closed) to connect the junction of resistances 48 and 49 to the indicator 29. Thus resistances 49 and 50 will be shorted out by the contact sets 40a and 41a respectively and the voltage applied to the indicator 29 will rise to a calibration corresponding to the height of that element above the plate 27. The resistance 51 is included in the circuitt so that any failure of the power source will be immediately apparent on the indicator 29 as its calibration corresponding to the datum level is determined by th voltage at the junction of resistances 50 and 51.

As shown in FIGURES 1 and 2, the extremity of each probe is pointed so that when the level of the water on the surface 23 rises to just contact the probe a proper electrical contact is made by the water creeping up the probe point due to surface tension to provide a relatively large area of contact. Also due to the surface tension of the water, contact with a particular probe will not be broken until the level of the water has fallen below the level of the probe extremity. This then sets a limit to the minimum difference in level between one probe extremity and the next, experiments having determined that with rainwater contact will not be broken until the level of the water falls approximately 15 thousandths of an inch below the probe extremity.

Whilst the circuit of FIGURE 4 provides an inexpensive and effective apparatus for providing an indication of the level of water on a surface, it does have certain disadvantages, the foremost being that current is continuously passing through the elements when they are in contact with the water and erosion of the probe is found to occur due to electrolytic action. This is particularly in evidence when the water just contacts the point of a probe and remains at that level for some considerable period of time. We, therefore, provide a circuit as shown in FIGURE 5 which is designed to remove the current flowing through an element shortly after it is contacted by the water as the level thereof rises. Furthermore, we prefer to have the probes gold plated.

In certain applications it may be inconvenient to sink the relay box in the surface of, for example, a concrete aircraft runway, in consequence the underside surface 11 of the domed cover 1 is used as the reference or datum surface and an earth connection is taken from the cover which is either made of metal or has a metal plate secured to the underside surface thereof. The cover is bolted down on a surface as hereinbefore described with reference to FIGURE 1.

Referring now to FIGURE 5 there is shown an electrical circuit having a transformer 60 whose primary winding is connected via an ON/OFF switch 61 and a push button switch 62 to a source of power, for example 230 volt 50 cycle. The secondary winding of the transformer 60 is connected to a bridge rectifier 63 via a fuse 64, the rectified alternating current from the transformer is applied to operating coils 65 to 69 of five relays. Associated with the operating coil of each relay are two sets of contacts A and B. The A contact set comprises a contact movable between two fixed contacts A1 and A2, and so arranged that a circuit is made through contact A2 before the circuit is broken through contact A1. The B contact set comprises one fixed and one movable contact. The position of the movable contacts illustrated in FIGURE 5 is the "normal" contact operating position, that is to say when none of the elements are contacted by water rising above the level of the underside surface 11 of the domed cover 1. The A2 contacts associated with operating coils 65 and 69 are connected to the negative terminal of the bridge rectifier 63 which is connected to earth via resistances 70 to 74 and the A1 contacts are connected to the elements 3 to 7 respectively. Across the primary winding of transformer 60 is a circuit including an A.C. voltmeter 75, similar to the indicator 29 of FIGURE 4, connected in series with five parallel connected branches each including one of the B contact sets associated with operating coils 65 to 69 connected in series with one of a plurality of resistances 76 to 80 respectively. A further resistance 81 is connected in parallel with the five branches.

To operate the circuit of FIGURE 5 the switch 61 is closed. To obtain an indication of the level to which water has risen above the underside of surface 11 of the domed cover 1 of the device shown in FIGURES 1 to 3, the push button switch 62 is depressed applying the 230 volt 50 cycle source to the primary winding of transformer 60. The bridge rectifier 63 applies a D.C. potential, for example, 300 volts to one side of the operating coils 65 to 69. Assume, for example, that level of the water had risen to contact the probe of element 3 and to just contact the probe of element 4. A circuit is thus made through the A1 contacts associated with coils 65 and 66, the elements 3 and 4 to earth. The movable contacts of the A contact sets associated with coils 65 and 66 will move to the A2 contacts thus breaking the circuit through the elements 3 and 4 but completing a circuit through resistances 70 and 71 to hold the two relays in their energized state since contact is made with the A2 contacts before the movable contacts break with the A1 contacts. At the same time the B contacts associated with energizing coils 65 and 66 will close to connected resistances 76 and 77 in parallel with the resistance 81 and thus increase the voltage applied to meter 75. The meter 75 is calibrated in steps of 0.1 inch to correspond with the difference in height of each probe above the reference surface 11.

The resistance 81 is included in the circuit to provide a reading on meter 75 corresponding to the level of the reference surface so that any failure in the 230 volt 50 cycle source will cause the meter to read below this arbitrary reference level.

It will be seen that the circuit provides a convenient indication of depth of water lying on the surface 23 without the attendant disadvantage of having current continuously flowing through those probes in contact with the water. The resistances 76 to 80 are chosen to apply equal increases in voltage to the meter 75 as each of the probes of elements 3 to 7 are successively contacted to energize the respective coils 65 to 69.

I claim:

1. A conductive liquid level sensing device comprising a domed cover for mounting on a level surface; said cover having a flat electrically conductive bottom surface, a centrally disposed chamber and a plurality of grooves radially extending from said chamber to the outer periphery of said cover to allow ingress of liquid lying on said surface into said chamber, a plurality of sensing elements each having a body portion and a pointed probe secured thereto, means for mounting the elements within said chamber with the points of said probes at successively increasing levels above said bottom surface to permit liquid to creep up the probe point due to surface tension to provide a large area of contact on the probe, and means to adjust the level of each probe above said bottom surface.

2. A conductive liquid level sensing device according to claim 1 in which said mounting means includes a plate and bosses in which said body portions are threaded.

3. A conductive liquid level sensing device according to claim 1 in which said probes are gold plated.

4. A conductive liquid level sensing device according to claim 1 including an electric circuit connected to said elements and said bottom surface, said circuit comprising indicating means and a plurality of latching relays each connected to a different one of said elements and operable to latch in a position to connect said indicating means to successively increasing voltages upon said probes being contacted by liquid in conducting relation with said bottom surface.

5. A conductive liquid level sensing device comprising a domed cover for mounting on a level surface, said cover having a centrally disposed chamber, a plurality of sensing elements each having a tip of triangular cross section, an apex thereof providing a contact for the liquid, means for mounting said elements to locate the apex of said tips thereof at different levels relative to said surface, means for adjusting the level of each element relative to said surface, a common electrode and an electric circuit including indicator means responsive to completion of an electrically conductive path through said common electrode and at least one of said elements by a liquid lying on said surface to give an indication dependent on the level of the uppermost element contacted by the liquid.

6. A water level sensing device comprising a domed cover for mounting on a level surface, said cover having a centrally disposed chamber and a plurality of grooves radially extending therefrom to the periphery of said cover to allow ingress of water lying on said surface into said chamber, a plurality of sensing elements each having a threaded body portion and a probe secured thereto, said probe having a tip of triangular cross-section with the apex providing a contact for the water, means for mounting said elements within said chamber, said mounting means including means for adjusting the position of said probes relative to said surface comprising a plurality of internally threaded bosses each receiving a different one of said body portions and means for locking each body portion in its adjusted position, a common electrode providing a datum level relative to which the position of the tips of said probes are adjusted and means for connecting said common electrode and said probes to an electric circuit.

7. A conductive liquid level sensing device comprising a domed cover for mounting on a level surface, a plurality of sensing elements each having a threaded body portion and a pointed probe secured thereto for contacting liquid at the point to permit surface tension to increase the area of contact, means for mounting said elements within said chamber, said mounting means including a plurality of internally threaded bosses each receiving a different one of said body portions and means for locking each body portion relative to its associated boss in a position such that said probes are each at a different level relative to said surface, a common electrode, an electric circuit including indicator means responsive to completion of an electrically conductive path through said common electrode and at least one of said elements by a liquid lying on said surface to give an indication dependent on the level of the upper-most probe contacted by the liquid, a voltage source giving a series of outputs of successively increasing magnitude and a plurality of relays each associated with a different one of said elements and operable to make a connection between said voltage output and said indicator means upon said liquid contacting a probe associated with that relay.

8. A conductive liquid level sensing device according to claim 7 in which said relays are latching relays operable to break the conductive path between an element and said common electrode after said indicator means is connected by that relay to said voltage source.

References Cited by the Examiner
UNITED STATES PATENTS

| | | | |
|---|---|---|---|
| 1,124,055 | 1/15 | Moorefield et al. | 73—304 |
| 2,202,197 | 5/40 | Ewertz | 73—304 |
| 2,412,363 | 12/46 | Silverman | 73—304 |
| 2,748,220 | 5/56 | Lung | 340—244 |
| 2,839,742 | 6/58 | Sumner | 340—244 |
| 2,869,368 | 1/59 | Brown | 73—304 |
| 2,975,637 | 3/61 | Burdick | 73—304 |
| 3,025,464 | 3/62 | Bond | 73—304 |
| 3,100,347 | 8/63 | Fritze | 73—304 |

ISAAC LISANN, *Primary Examiner.*